Feb. 18, 1964     L. W. JOHNSON ETAL     3,121,515
DISTRIBUTOR OF FLUENT MATERIALS WITH MEANS
TO VARY THE QUANTITY DISTRIBUTED
Filed Dec. 14, 1959     2 Sheets-Sheet 1
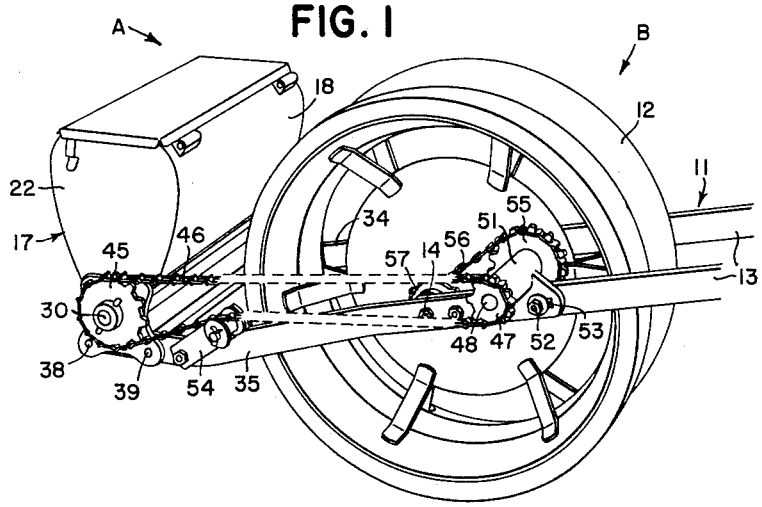
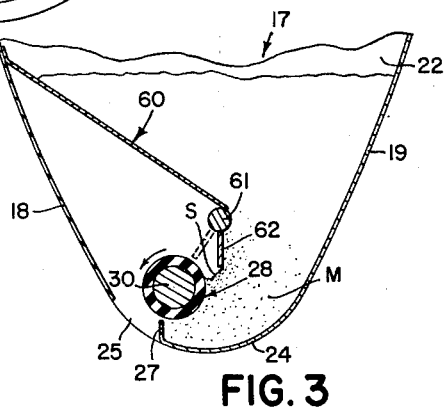
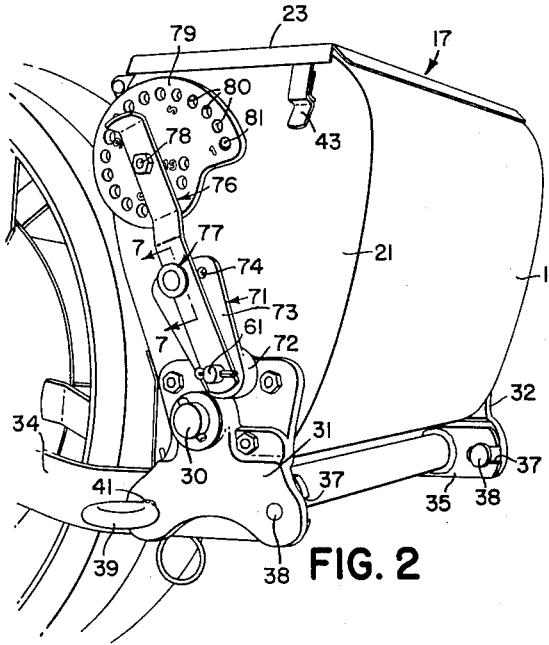
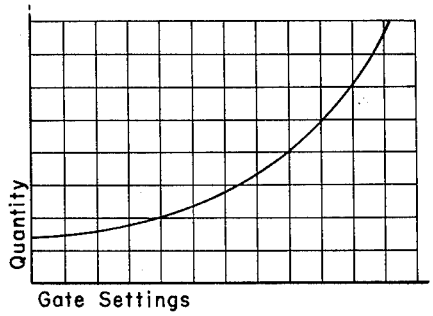
INVENTORS.
LESLIE W. JOHNSON
HARRY M. MEINERT
BY
ATTORNEYS Feb. 18, 1964   L. W. JOHNSON ETAL   3,121,515
DISTRIBUTOR OF FLUENT MATERIALS WITH MEANS
TO VARY THE QUANTITY DISTRIBUTED
Filed Dec. 14, 1959   2 Sheets-Sheet 2

INVENTORS.
LESLIE W. JOHNSON
HARRY M. MEINERT
BY
ATTORNEYS

United States Patent Office 3,121,515
Patented Feb. 18, 1964

3,121,515
DISTRIBUTOR OF FLUENT MATERIALS WITH MEANS TO VARY THE QUANTITY DISTRIBUTED
Leslie W. Johnson, Moline, and Harry M. Meinert, East Moline, Ill., assignors to Deere & Company, Moline, Ill., a corporation of Delaware
Filed Dec. 14, 1959, Ser. No. 859,452
10 Claims. (Cl. 222—317)

This invention relates generally to methods of, and apparatus for dispensing fluent material and more particularly to machines for dispensing agricultural chemicals evenly and uuniformly over a wide range of quantity adjustments.

The object and general nature of this invention is the provision of a method of, and apparatus for dispensing fluent materials where, by varying the effective level of fluent material which contact the upwardly moving side of the material engaging surface of a rotary member, the quantity or rate of material which is carried up over the top of the roller and then dispensed can be varied.

A further object of this invention is the provision in a dispensing mechanism for agricultural chemicals of adjusting mechanisms so constructed and arranged as to provide for a control adjustment that is effective in a low rate range as well as in a high rate range. In some distributors with which we are familiar, the construction is such that during control of the low rate flows, the desired rate of application must be secured and controlled by only minute movement of the adjusting part. On the other hand, according to this invention, we provide control means that is movable through well defined and relatively widely spaced apart positions, not only during control of the high rates of flow but also during low rates of flow.

Another feature of this invention is the provision of flow control means that is movable through well defined and relatively well spaced apart positions for the different flow variations available. By virtue of this construction, almost any desired rate of discharge, whether large or small, may readily be selected when desired.

These and other objects and advantages of the present invention will be apparent to those skilled in the art after a consideration of the following detailed description, taken in conjunction with the accompanying drawings in which:

FIG. 1 is a fragmentary perspective view showing an agricultural chemical distributor connected behind the press wheel of a planter, the latter being indicated only fragmentarily.

FIG. 2 is a fragmentary perspective view, showing the adjustable quantity control means in one position of adjustment.

FIG. 3 is a fragmentary sectional view showing two different positions of the flow controlling gate.

FIG. 9 is a chart indicating the pattern of flow variation secured for given increments of movement of the adjusting means.

Figure 4:
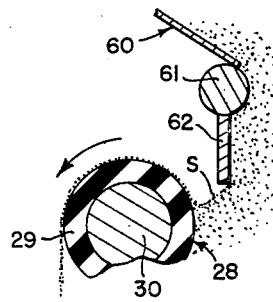
FIGS. 4 and 5 are fragmentary sectional views, somewhat similar to FIG. 3, showing at an enlarged scale two different positions of the flow controlling gate.

Referring first to FIGS. 1 and 2, the agricultural chemical distributor incorporating the principles of this invention has been illustrated as in the form of an attachment A connectible to an agricultural implement B, such as a more or less conventional corn planter having a press wheel frame 11 to the rear portion of which a press wheel 12 is connected in the usual way. The press wheel frame 11 includes a pair of generally fore-and-aft extending bars 13 carrying at the rear end the transverse shaft member 14 that receives and supports the bearing means on which the press wheel 12 is journaled. The press wheel 12 rolls along the ground compressing the soil about the planted seed and, being in contact with the ground, readily serves as means for driving the movable parts of the distributing mechanism, as will be desecribed in detail below.

The chemical distributor attachment A comprises a hopper 17 that includes front and rear side walls 18 and 19, a pair of end walls 21 and 22, and a hinged cover 23. The side walls 18 and 19 are faired into a bottom wall section 24 that is formed with a discharge opening 25. The opening 25 extends generally longitudinally of the hopper 17 and the latter includes a vertical wall section 27 that extends upwardly to a point closely adjacent a feed roller 28, as best shown in FIG. 3. The roller member includes a sleeve-like outer section 29 formed of a rubber or rubber-like material, carried by a cross shaft 30 journaled at its ends for rotation in a pair of end castings 31 and 32, the latter being generally of identical construction except that they are made in rights and lefts.

The hopper 17 and associated parts are supported through the end members 31 and 32 on a pair of auxiliary frame bars 34 and 35, each of the latter bars being slotted, as at 37, so as to be capable of being passed over into supported relation on a pair of headed studs 38 formed on or carried by the rear and lower portions of the end members 31 and 32. Forwardly of the slots 37, the bars 34 and 35 are apertured to receive an elongated quick detachable pin 39 that is extended through apertures 41 formed in the lower forward portion of the two end members 31 and 32 and through registering apertures formed in the rear portions of the bars 34 and 35. As will best be seen from FIG. 2, the hopper 17 may readily be disconnected, when desired, by withdrawing the pin 39 and then sliding the hopper rearwardly from the slots 37. Alternately, if the hopper is merely to be cleaned out and not necessarily removed, cleaning may readily be accomplished by removing the pin 39 and tipping the hopper 17 over rearwardly and downwardly about the studs 38 as an axis. A spring clip 43 retains the lid or cover in its closed position.

As mentioned above, one of the principal features of this invention is the provision of means whereby a plurality of flow adjustments may be secured easily and conveniently, irrespective of whether adjustments are to be made in the low range or in the high range. The end members 31 and 32 are so constructed and arranged that the roller 28 is supported in the lower portion of the hopper but above the bottom wall 24 thereof. The shaft 30 of the roller carries a sprocket 45 that is adapted to be driven by chain 46 that is trained over a driving pinion 47 mounted on a short shaft 48. The latter is carried for rotation in a countershaft housing 51 provided with a flange by which the housing is bolted, as at 52, to the right hand press wheel frame bar 13. The bolts 52, as shown in FIG. 1, extend through slots 53 in the flange of the housing 51 and through openings in the frame bars 13, whereby the countershaft bearing housing may be shifted relative to the press wheel frame for the purpose of applying or removing the drive chain 56 and/or keeping the latter taut. The drive chain 46 is kept taut by friction-held adjustable idler 54. The inner end of the countershaft 48 carries a sprocket 55 that is driven by a chain 56 from a driving pinion 57 connected to the press wheel 12.

As will best be seen in FIG. 3, the roller 28 is rotated in the direction of the arrow shown in this figure, and this movement of the roller is utilized to carry material out of the hopper and discharge the same downwardly through the discharge opening 25. For example, one type of material for which the attachment has been designed is granular herbicide which is used for pre-emergence weed control, this material being dispensed in a fairly wide band immediately following the planting and seed covering operation. In conventional corn planter operations, the width of the granular herbicide band is approximately 14 inches but this may, of course, vary.

Figure 5:
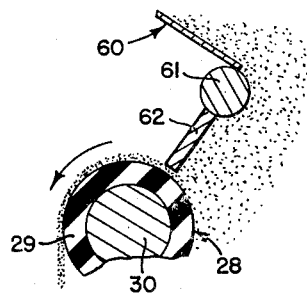
Figure 8:
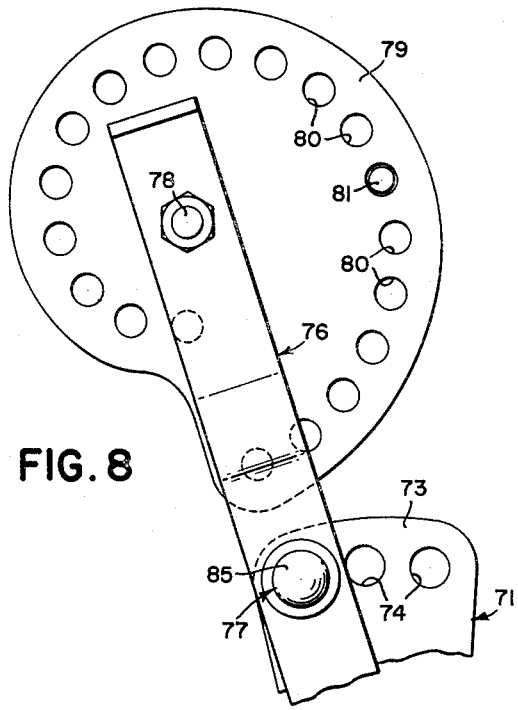
FIG. 8 is a fragmentary view similar to FIG. 2 but showing a different position of the gate controlling means.
Figure 6:
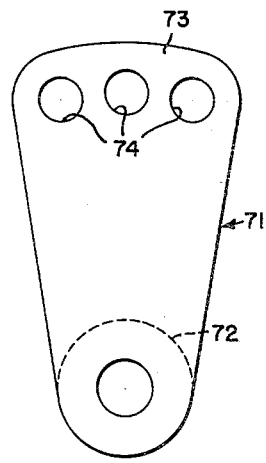
FIG. 6 is a detailed view of the rate control bracket.

The present distributor is designed to employ a new principle in quantity control wherein the rate of flow is controlled by raising and lowering the line of contact between the upper half of the upwardly moving side of a feed roll and the plane of the upper surface of the fluent material adjacent the feed roll. According to this invention, the material to be dispensed is fed to one upwardly moving side of a rotating roll having a material engaging surface from an adjacent auxiliary reservoir or pool of material M maintained near the roller, and the line of contact of the material at the line where it contacts the upwardly moving side of the roll is maintained somewhere within the fourth quadrant as respects the direction of rotation; namely, between the topmost portion of the roll and a point more or less closely adjacent the horizontal plane that passes through the axis of rotation of the roller. For example, the fourth quadrant as respects to the direction of rotation would lie between 12 and 3 o'clock if the roll is rotating in a counterclockwise direction as indicated in the drawings. Similarly if the roll were to rotate in a clockwise direction the fourth quadrant of rotation would lie between 9 and 12 o'clock. Quantity or rate of flow from the hopper is then controlled by raising or lowering the line of contact between the plane of the upper surface of the pool or reservoir of material M and the surface of the feed roll. It has been found that, where the line of contact of the material engaging the side of the roller is disposed well up towards the top of the roller, greatly increased quantities of the material will be carried over the top of the roller and dropped downwardly to the discharge opening as illustrated in FIG. 5, whereas when the line of contact of the material is maintained in a lower position, down about where the aforesaid horizontal plane intersects the surface of the roller, much smaller quantities of material will be carried up by the rotation of the roller and dropped down on the other side through the discharge opening as illustrated in FIG. 4. Applicants' means to control the level of the material that lies against the side of the roller in operation will now be described.

Referring again to the preferred embodiment illustrated in FIG. 3, extending downwardly from one side wall 18 of the hopper is a baffle 60 that is disposed well above the roller 28 and extends from said one side of the hopper above and past the roller 28 toward the other side of the hopper. The baffle 60 is supported in any suitable way in the hopper as by welding to the hopper side wall 18 and the end walls 21 and 22, and at its lower edge the baffle is disposed substantially against a rockable shaft 61 movably supported in the upper portions of the hopper end members 31 and 32. A gate or means 62 is fixed in any suitable way to the shaft 61, such as by welding or the like, and, as best shown in FIG. 3, the shaft 61 is so located relative to the roller 28 that in one position of the shaft the vane or gate 62 extends downwardly and is spaced away from the roller a suitable distance.

As will be seen from FIG. 3, the baffle 60 serves to support the main portion of the mass of material in the hopper so that a reservoir or auxiliary mass M of material is maintained in the lower portion of the hopper. The material flows downwardly across the baffle 60 and past the gate 62 in its full line position so that the plane of the upper surface S of the material M in the reservoir intersects the roller within the fourth quadrant as respects to the direction of rotation. The upper surface of the material adjacent the roller 28 is indicated by the surface S, the angle or plane of the surface S relative to the horizontal representing the angle of repose of the material. When the line of contact between the upper surface of the material and the feed roll is relatively near the horizontal plane that passes through the axis of the feed roll, as will be seen from FIG. 4, only a relatively small amount of the material will be drawn up over the top of the roller 28 as it is revolved. However, as the shaft 61 is rocked to carry the gate or means 62 upwardly and toward the upper portion of the roller toward the position shown in FIG. 5, the line of contact of the upper surface S relative to the roller is raised so that additional quantities of material will now be drawn over the roller and discharged through the opening 25, as illustrated in FIGS. 3 and 5. The dotted line position of the gate 62 in FIG. 3 represents the position wherein lower edge of the gate approaches the upper part of the roller but is spaced therefrom and it can be seen that the distance between the surface of roller and the surface of the shaft 61 is less than the length of the gate 62. The maximum discharge that can be secured in the arrangement shown is achieved where the gate is in such a position that it does not restrict the flow of material. Thus if the gate is swung to a position where the surface S of the material does not contact the gate 62, maximum flow will be achieved. This will vary with the material dispensed since the angle of repose of various materials is different. Therefore the maximum position for the gate 62 is that position where a line taken through its bottom corner and the lower periphery of the shaft 61 is at or above the angle of repose of the material within the hopper. Thus, according to this invention, we provide a quantity control that is effected principally merely by raising or lowering the level of the material that is maintained against one side of the roller, raising the level serving to increase the quantity discharged and lowering the level serving to decrease the quantity discharged.

When distributing very small quantities by the usual means, such as a slide opening and closing an opening in the bottom of a hopper, very small minute movements of the slide when it is almost in its closed position provides relatively great changes in the quantity distributed. This is undesirable on account of the difficulty of accurately and uniformly effecting small changes in the position of the slide and the impossibility of securing uniform small changes in the quantity discharged. According to this invention, however, the opposite is true. That is, relatively large changes in the position of the gate in its nearly vertical position (full lines in FIG. 3) produces only relatively small changes in the amount of material discharged. This is true because when, for example, the gate 62 is in the vertical position or nearly so, changes in the angular position of the gate as it swings toward or away from the roller effects only relatively small changes in the level of the material normally maintained against the side of the roller.

A number of tests have been run with the device as illustrated in the accompanying drawings, and the chart shown in FIG. 9 represents the pattern of distribution for various positions of the gate. Thus uniform changes in the angular position of the gate 62, which are represented along the horizontal line at the lower edge of the chart, produce initially relatively small changes in the quantity distributed, the quantity being indicated along the left hand vertical side of the chart. Then, as the level of material is raised relative to the roller, given changes in the setting of the gate produce increasingly greater changes in the quantity distributed.

According to this invention, means is provided for producing uniform changes in the angular setting of the gate 62. Referring now to FIG. 2, a rate control bracket 71 is mounted in fixed relation to one end of the shaft 61 outside the end wall 21 of the hopper. The member 71 includes a hub portion 72 fixed to the outer end of the shaft 61 and a segmental section 73 provided with three openings 74. An adjusting lever 76 is apertured at its lower end to receive the shaft 61 and upwardly from the shaft 61 the bracket 71 is apertured to receive a fastener 77 that is adapted to be disposed in selected openings 74 for fixing the handle 76 in position on the rate control bracket 71. The upper portion of the handle is apertured to receive a pivot bolt 78 by which an adjusting bracket 79 is rotatably connected with the lever 76. The adjusting bracket 79 is provided with a spiral series of openings, indicated generally at 80, and any one of these openings may be passed over a pin 81 or stud carried by the hopper end member 21.

Figure 7:
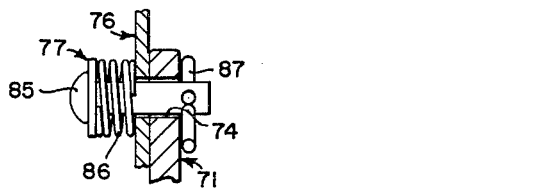
FIG. 7 is a section taken generally along the line 7—7 of FIG. 2.

In order that rate selection may easily and conveniently be effected, the fastener 77 is in the form of a drilled rivet 85 (FIG. 7) extending through the selected opening 74 in the rate control bracket 71 and through a spring 86 that lies between the head of the rivet 85 and the lever 76. A hairpin connector 87 is extended through an opening in the other end of the rivet 85 for holding the latter in place on the rate control bracket 71. Thus, whenever a change in rate of distribution is desired, the lever 76 is moved outwardly against the spring 86 a distance sufficient to disengage the adjusting bracket 79 from the stud 81 and then the bracket 79 is rotated on the bolt 78 to another position in which the selected opening 80 may be engaged with the stud 81.

By moving the member 85 from one opening 74 in the member 71 to another opening therein, the range of adjustment effected by changing the openings 80 on the stud 81 may be changed, as desired. For example, the three openings 74 shown in the member 71 provide for high, medium and low ranges of adjustment. This is for the purpose of allowing for differences in various herbicide materials or other chemicals it is desired to dispense. In the construction shown in the drawings, there are 19 openings 80 in the member 79, and with the three openings 74 in the rate control bracket 71, the distributor of this invention provides for 57 different rates of flow, the flow varying according to the chart shown in FIG. 9.

While we have shown and described above the preferred structure in which the principles of this invention have been incorporated, it is to be understood that our invention is not to be limited to the particular details, shown and described, but that, in fact, widely different means may be employed in the broader aspects of our invention.

What we claim, therefore, and desire to secure by Letters Patent is:

1. In combination with a fluent distributing apparatus of the class described having a hopper having side and end walls and a bottom wall having an opening extending generally longitudinally of the hopper, a roller disposed for rotation in the hopper adjacent said opening, a first shaft supporting said roller and rotatably carried by said end walls, an adjustable gate disposed adjacent said roller, and a second shaft supporting said gate for rocking movement, said second shaft being rotatably carried by said end walls and having a portion extending beyond one of said end walls; means to rotatably adjust said gate comprising: lever means secured to said extended portion, an adjusting member pivoted at a generally central point to the outer end portion of said lever means, said member having a generally spiral-like series of openings disposed about the pivot connection with said lever means, and a lug carried by said one end wall, said openings being selectively engageable with said lug for retaining the lever means in different position of adjustment.

2. The invention as defined in claim 1, further characterized by said lever means comprising a first lever fixed to said extended portion, a second lever journaled about said extended portion, means pivotally securing said adjusting member to the outer end of said second lever, and means connecting said second lever with said first lever at any one of a plurality of optional positions.

3. The invention set forth in claim 1, further characterized by said last-mentioned means including a plurality of openings on one of said levers intermediate said extended portion and said adjusting member, and means carried by the other of said levers cooperable with said openings to hold the levers together in one of a plurality of optional fixed positions.

4. In combination with a fluent distributing apparatus of the class described having a hopper having side and end walls and a bottom wall having an opening extending generally longitudinally of the hopper, a roller disposed for rotation in the hopper adjacent said opening, a first shaft supporting said roller and rotatably carried by said end walls, an adjustable gate disposed adjacent said roller, and a second shaft supporting said gate for rocking movement, said second shaft being rotatably carried by said end walls and having a portion extending beyond one of said end walls; means to rotatably adjust said gate comprising: a first lever fixed to said extended portion, said first lever having a plurality of openings spaced radially from said portion, a second lever journaled at one end about said extended portion, means carried by an intermediate portion of said second lever cooperable with said openings to hold the levers together in one of a plurality of optional fixed positions, an adjusting member secured to the other end of said second lever, and means carried by said one end wall and cooperable with said adjusting member to hold the second lever in different positions of adjustment with respect to said one wall.

5. In a distributing apparatus having fluent control means movable through a given range from a first position in which a minimum amount of fluent material is distributed to a second position in which a maximum amount of fluent material is distributed, means to position said control means within said range comprising means rotatable about a given axis and operatively interconnected with said flow control means, lever means fixed to said rotatable means and extending outwardly therefrom, an adjustable member pivoted at a generally central point to the outer end portion of said lever means, said member having a generally spiral-like series of openings disposed about the pivot connection with said lever means, and a lug on said apparatus, said openings being selectively engageable with said lug for retaining the lever means in different positions of adjustment.

6. The invention as defined in claim 5, further characterized by said lever means comprising a first lever fixed to said extended portion, a second lever journaled about said extended portion, means pivotally securing said ajusting member to the outer end of said second lever, and means connecting said second lever with said first lever at any one of a plurality of optional positions.

7. In combination with a fluent distributing apparatus of the class described having a hopper having side and end walls and a bottom wall having an opening extending generally longitudinally of the hopper, a roller disposed for rotation in the hopper adjacent said opening, a first shaft supporting said roller and rotatably carried by said end walls, an adjustable gate of fixed length disposed adjacent said roller, and a second shaft supporting said gate for rocking movement, said second shaft being rotatably carried by said end walls parallel to and above and to one side of said first shaft, the distance between the surface of the roller and the surface of the second shaft being appreciably greater than the length of the gate, said second shaft having a portion extending beyond one of said end walls; means to rotatably adjust said gate comprising: lever means secured to said extended portion, an adjusting membr pivoted at a generally central point to the outer end portion of said lever means, said member having a generally spiral-like series of openings disposed about the pivot connection with said lever means, and a lug carried by said one end wall, said openings being selectively engageable with said lug for retaining the lever means in different positions of adjustment.

8. The invention as defined in claim 7, further characterized by said lever means comprising a first lever fixed to said extended portion, a second lever journaled about said extended portion, means pivotally securing said adjusting member to the outer end of said second lever, and means connecting said second lever with said first lever at any one of a plurality of optional positions.

9. The invention set forth in claim 8, further characterized by said last-mentioned means including a plurality of openings on one of said levers intermediate said extended portion and said adjusting member, and means carried by the other of said levers cooperable with said openings to hold the levers together in one of a plurality of optional fixed positions.

10. In combination with a fluent distributing apparatus of the class described having a hopper having side and end walls and a bottom wall having an opening extending generally longitudinally of the hopper, a roller disposed for rotation in the hopper adjacent said opening, a first shaft supporting said roller and rotatably carried by said end walls, an adjustable gate of fixed length disposed adjacent said roller, and a second shaft supporting said gate for rocking movement, said second shaft being rotatably carried by said end walls parallel to and above and to one side of said first shaft, the distance between the surface of the roller and the surface of the second shaft being appreciably greater than the length of the gate, said second shaft having a portion extending beyond one of said end walls; means to rotatably adjust said gate comprising: a first lever fixed to said extended portion, said first lever having a plurality of openings spaced radially from said portion, a second lever journaled at one end about said extended portion, means carried by an intermediate portion of said second lever cooperable with said openings to hold the levers together in one of a plurality of optional fixed positions, an adjusting member secured to the other end of said second lever, and means carried by said one end wall and cooperable with said adjusting member to hold the second lever in different positions of adjustment with respect to said one wall.

References Cited in the file of this patent

UNITED STATES PATENTS

| | | |
|---|---|---|
| 663,902 | Hutchison | Dec. 18, 1900 |
| 1,319,377 | Cooper | Oct. 21, 1919 |
| 1,345,120 | Bissell et al. | June 29, 1920 |
| 1,437,863 | Raymond | Dec. 5, 1922 |
| 1,823,905 | Kruetzberg | Sept. 22, 1931 |
| 2,046,603 | Baumgarner | July 7, 1936 |
| 2,159,554 | George | May 23, 1939 |
| 2,510,231 | Juzwiak | June 6, 1950 |
| 2,678,145 | Juzwiak et al. | May 11, 1954 |
| 2,918,199 | Marraffino | Dec. 22, 1959 |

UNITED STATES PATENT OFFICE
CERTIFICATE OF CORRECTION

Patent No. 3,121,515 February 18, 1964

Leslie W. Johnson et al.

It is hereby certified that error appears in the above numbered patent requiring correction and that the said Letters Patent should read as corrected below.

Column 6, line 3, for the claim reference numeral "1" read -- 2 --.

Signed and sealed this 30th day of June 1964.

(SEAL)
Attest:

ERNEST W. SWIDER
Attesting Officer

EDWARD J. BRENNER
Commissioner of Patents